(12) United States Patent
Nakai et al.

(10) Patent No.: US 8,542,214 B2
(45) Date of Patent: Sep. 24, 2013

(54) IMAGE DISPLAY DEVICE

(75) Inventors: Jun Nakai, Kanagawa (JP); Takashi Okohira, Kanagawa (JP); Shoichi Ishikawa, Kanagawa (JP); Shunsuke Sasanabe, Kanagawa (JP); Satoshi Tsuchiya, Tokyo (JP)

(73) Assignee: Panasonic Corporation, Osaka (JP)

(*) Notice: Subject to any disclaimer, the term of this patent is extended or adjusted under 35 U.S.C. 154(b) by 226 days.

(21) Appl. No.: 13/062,054

(22) PCT Filed: Jan. 28, 2010

(86) PCT No.: PCT/JP2010/000513
§ 371 (c)(1),
(2), (4) Date: Mar. 28, 2011

(87) PCT Pub. No.: WO2010/089980
PCT Pub. Date: Aug. 12, 2010

(65) Prior Publication Data
US 2011/0187675 A1  Aug. 4, 2011

(30) Foreign Application Priority Data

Feb. 6, 2009  (JP) ................ P2009-025745

(51) Int. Cl.
*G06F 3/044* (2006.01)
(52) U.S. Cl.
USPC ........................................... 345/174
(58) Field of Classification Search
USPC ........................ 345/173–174, 156
See application file for complete search history.

(56) References Cited

U.S. PATENT DOCUMENTS

| 6,459,424 B1 * | 10/2002 | Resman ................ 345/173 |
| 6,498,613 B1 | 12/2002 | Wajima |
| 2006/0178827 A1 | 8/2006 | Aoyama |
| 2009/0309851 A1 * | 12/2009 | Bernstein ................ 345/174 |
| 2011/0279364 A1 * | 11/2011 | Koshiyama et al. ......... 345/156 |

FOREIGN PATENT DOCUMENTS

| JP | 2000-242387 A | 9/2000 |
| JP | 2002-358162 A | 12/2002 |
| JP | 2003-195998 A | 7/2003 |
| JP | 2006-220884 A | 8/2006 |
| JP | 2007-199980 A | 8/2007 |

OTHER PUBLICATIONS

International Search Report for International Application No. PCT/JP2010/000513, May 11, 2010, Panasonic Corporation.

* cited by examiner

*Primary Examiner* — Quan-Zhen Wang
*Assistant Examiner* — Tony Davis
(74) *Attorney, Agent, or Firm* — RatnerPrestia

(57) ABSTRACT

An image display device includes an image display unit, a capacitance type touch panel that is disposed on the surface of the image display unit, and a signal processing unit that outputs to a control unit a position signal corresponding to a pressed position on the touch panel or a signal corresponding to the distance between the touch panel and a finger based on the capacitance between the touch panel and the finger. When the approach of the finger to the touch panel is detected, sensitivity is lowered and a menu button is displayed. When the finger moves while pressing the menu button, a menu area and a menu icon are displayed. Accordingly, it is easy to operate the touch panel which is applied to a vehicle-mounted apparatus and it is easy to see a display screen.

7 Claims, 10 Drawing Sheets

FIG. 7
(a)
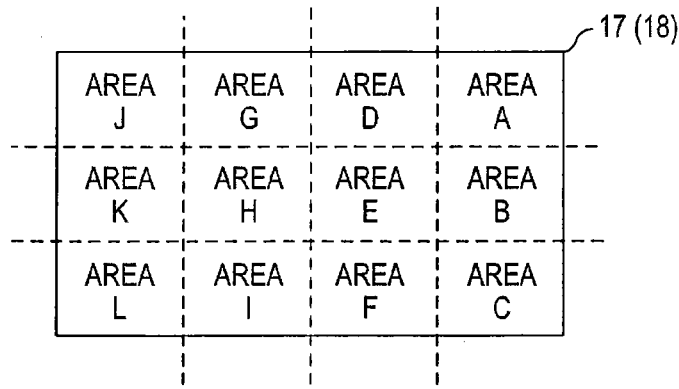
(b)
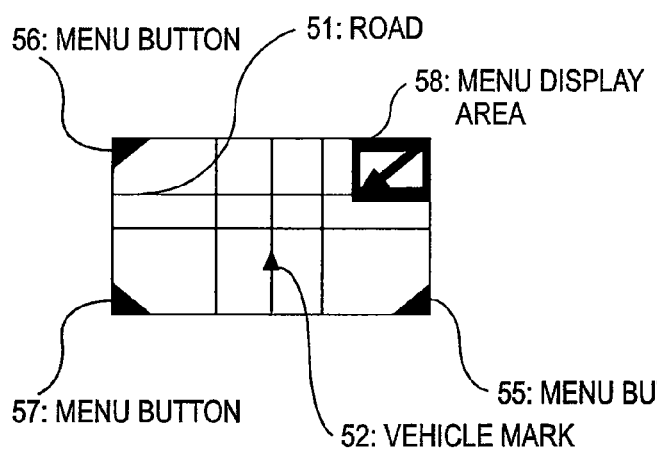
56: MENU BUTTON
51: ROAD
58: MENU DISPLAY AREA
57: MENU BUTTON
55: MENU BUTTON
52: VEHICLE MARK
(c)
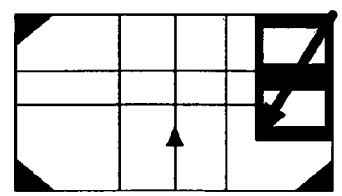
(d)
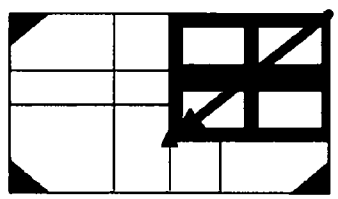
(e)
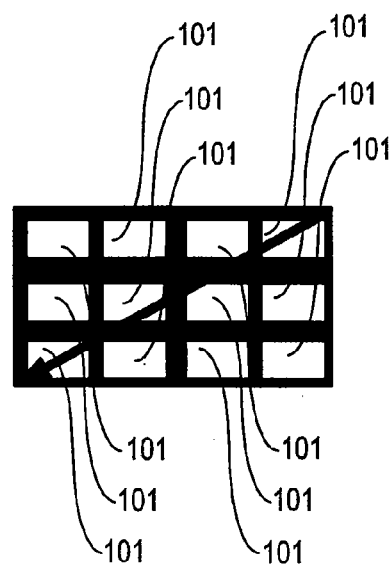
101

IMAGE DISPLAY DEVICE

This application is a U.S. National Phase Application of PCT International Application PCT/JP10/000513.

TECHNICAL FIELD

The present invention relates to an image display device equipped with a touch panel, and more particularly, to an image display device used in a vehicle-mounted apparatus such as a navigation apparatus.

BACKGROUND ART

A conventional touch panel has a configuration in which a transmissive touch panel is disposed on the surface of a liquid crystal display panel, a finger approach signal processing unit detecting the approach of a user's finger by the use of infrared rays or micro waves is provided, and a guiding image is displayed along with a menu using the liquid crystal display panel. A navigation apparatus employing such a conventional touch panel is disclosed in which the approach of a finger to the touch panel is detected by the finger approach signal processing unit and a menu is displayed on the display unit when a user's operation is received by the touch panel through the menu displayed on the display unit (see PTL 1).

That is, a conventional image display device has been known which is applied to, for example, a car navigation apparatus and which displays a menu with the approach of the finger to the touch panel when receiving a user's operation through the use of the touch panel disposed on the display screen, whereby it is possible to satisfactorily provide various pieces of information by effectively using the display screen with a limited size.

CITATION LIST

Patent Literature

[PTL 1] JP-A-2002-358162

SUMMARY OF INVENTION

Technical Problem

However, in the conventional device, since the approach of a finger is detected by the use of infrared rays or micro waves, a space for installing a signal processing unit detecting the approach of a finger is necessary in the vicinity of a display device such as a liquid crystal display. Accordingly, the device is complicated and increases in size, thereby making it hard to install the device in an installation space of a limited indoor space. In addition, there is a problem in that the size of a small-sized liquid crystal panel has to be smaller than the size of about 7 to 9 inches which is the current mainstream in order to ensure a device space for attaching an infrared sensor or the like to a vehicle and it is thus hard for a user to see the liquid crystal display.

In other words, in the conventional image display device, the approach of the user's finger is detected using infrared rays or micro waves and a space for installing the signal processing unit detecting the approach of the user's finger is necessary in the vicinity of the display unit of the image display device. However, when the image display device is applied as a vehicle-mounted device, the installation space for the image display device is limited and thus the space for the signal processing unit has to be ensured at the sacrifice of display area.

In this case, a liquid crystal panel with a size of about 7 to 9 inches which is the current mainstream is not suitable as a display device used for a display unit and it is thus necessary to use a display device with a smaller size. Accordingly, since it is hard for a user to see the contents displayed on the image display device and it is necessary to set a menu button and the like displayed on the display unit to be smaller, there is a problem in that it is hard for a user (operator) to operate the device.

The invention is made to solve the above-mentioned problems. An object of the invention is to provide an image display device in which a space for installing a signal processing unit detecting the approach of a user's finger is not necessary in the vicinity of a display unit of the image display device, a menu button is displayed on the display unit by changing the sensitivity for determining an input operation on a touch panel when the user's finger approaches the touch panel, it is easy to operate the image display device by changing the number of menu icons to be displayed on the display unit when the user's finger slides over the touch panel while pressing a displayed menu button, and it is easy to see the contents displayed on the display unit.

Solution to Problem

According to an aspect of the invention, there is provided an image display device in which options for performing functions of the image display device are hierarchized, including: an image display unit that displays the options; a capacitance type touch panel that is disposed on a surface of the image display unit; a signal processing unit that detects the capacitance varying with respect to an input operation on the touch panel; and a control unit that performs a function corresponding to the input operation, wherein the control unit performs a function of changing sensitivity of the touch panel to low sensitivity lower than high sensitivity and displaying a high-level option on the image display unit when it is detected that the capacitance is equal to or more than a predetermined value as an operator's finger is approached to the touch panel after the sensitivity of the touch panel is set to high sensitivity, and a function of setting a display area displaying a low-level option to a size corresponding to the distance by which the operator's finger moves over the touch panel while pressing the touch panel and displaying the low-level option in the display area when an input operation of pressing the high-level option with the operator's finger is detected.

According to this configuration, it is possible to display a button with the approach of a finger to the touch panel by changing the sensitivity for determining an input to the touch panel and to change the number of displayed menus by sliding over the button, thereby making it easy to operate the touch panel and to see the display screen.

In the image display device, the signal processing unit may convert a variation in the capacitance into a voltage, and the control unit may compare the value of the voltage converted by the signal processing unit with a second threshold value greater than a first threshold value and may change the sensitivity of the touch panel when the control unit determines that the value of the voltage output from the signal processing unit is greater than the first threshold value.

According to this configuration, when it is intended to display a menu button, it is possible to display a high-level option without pressing the touch panel only by causing the finger to approach the touch panel.

In the image display device, the control unit may divide the image display unit into a plurality of areas and may display the high-level option corresponding to an area where the operator's finger is detected.

According to this configuration, it is possible to display only a desired menu button in the displayed high-level option and thus to suppress the size by which the image display unit is hidden with the high-level option, thereby reducing the loss in visibility.

In the image display device, the control unit may display the high-level option in at least one corner of the image display unit.

According to this configuration, it is possible to avoid hiding information at the center of the image which has been displayed before displaying the menu button.

In the image display device, when it is determined that the capacitance is equal to or greater than a predetermined value as the operator's finger is approached to the touch panel, the control unit may display the high-level option at a corner closest to a position of the finger where the input operation is detected among corners of the image display unit on the image display unit.

According to this configuration, it is possible to prevent the operator's hand from approaching a place other than the corners to cause an unintended operation.

In the image display device, the control unit may set the display area to an area including a position where the operator's finger starts pressing the touch panel and a position where the operator's finger ends the pressing of the touch panel.

According to this configuration, it is possible to display a menu display area and other output images on the single screen.

In the image display device, the control unit may set the display area to a rectangular area having a line segment, as a diagonal, that connects a position where the operator's finger starts pressing the touch panel and a position where the operator's finger ends the pressing of the touch panel.

According to this configuration, it is possible to display only menu icons to the number intended by the operator, thereby easily selecting the menu icons.

Advantageous Effects of Invention

According to the invention, the image display device employing a capacitance type touch panel has the configuration in which the signal processing unit detecting an input to the touch panel changes the sensitivity for determining the input to the touch panel to the detected value of the capacitance varying depending on the distance between the finger and the touch panel. Accordingly, since it is not necessary to dispose the signal processing unit detecting the approach of the user's finger in the vicinity of the display unit, it is possible to increase the size of the image display unit. The menu buttons are displayed when the finger approaches the touch panel, and the number of menu icons to be displayed can be changed by sliding over the menu buttons. Accordingly, it is possible to provide an image display device which can be easily operated and which has an easy-to-see screen.

BRIEF DESCRIPTION OF DRAWINGS

FIGS. 3(a), 3(c), 3(e), 3(g), 3(i), and 3(j) are diagrams schematically illustrating the front surface of an image display unit and FIGS. 3(b), 3(d), 3(f), and 3(h) are schematic side views of the image display unit.

FIG. 4(a) is a diagram schematically illustrating a state where a touch panel is pressed and FIG. 4(b) is a diagram schematically illustrating a state after an operation assigned to the pressed position on the touch panel is performed.

FIGS. 7(a) to 7(e) are diagrams schematically illustrating an example where a finger moves in the X and Y directions in the vehicle-mounted apparatus according to the embodiment of the invention.

DESCRIPTION OF EMBODIMENTS

Hereinafter, an image display device according to an embodiment of the invention will be described with reference to the accompanying drawings. In the following description, a vehicle-mounted image display device is exemplified as the image display device and thus the vehicle-mounted image display device is simply referred to as a "vehicle-mounted apparatus".

Figure 1:
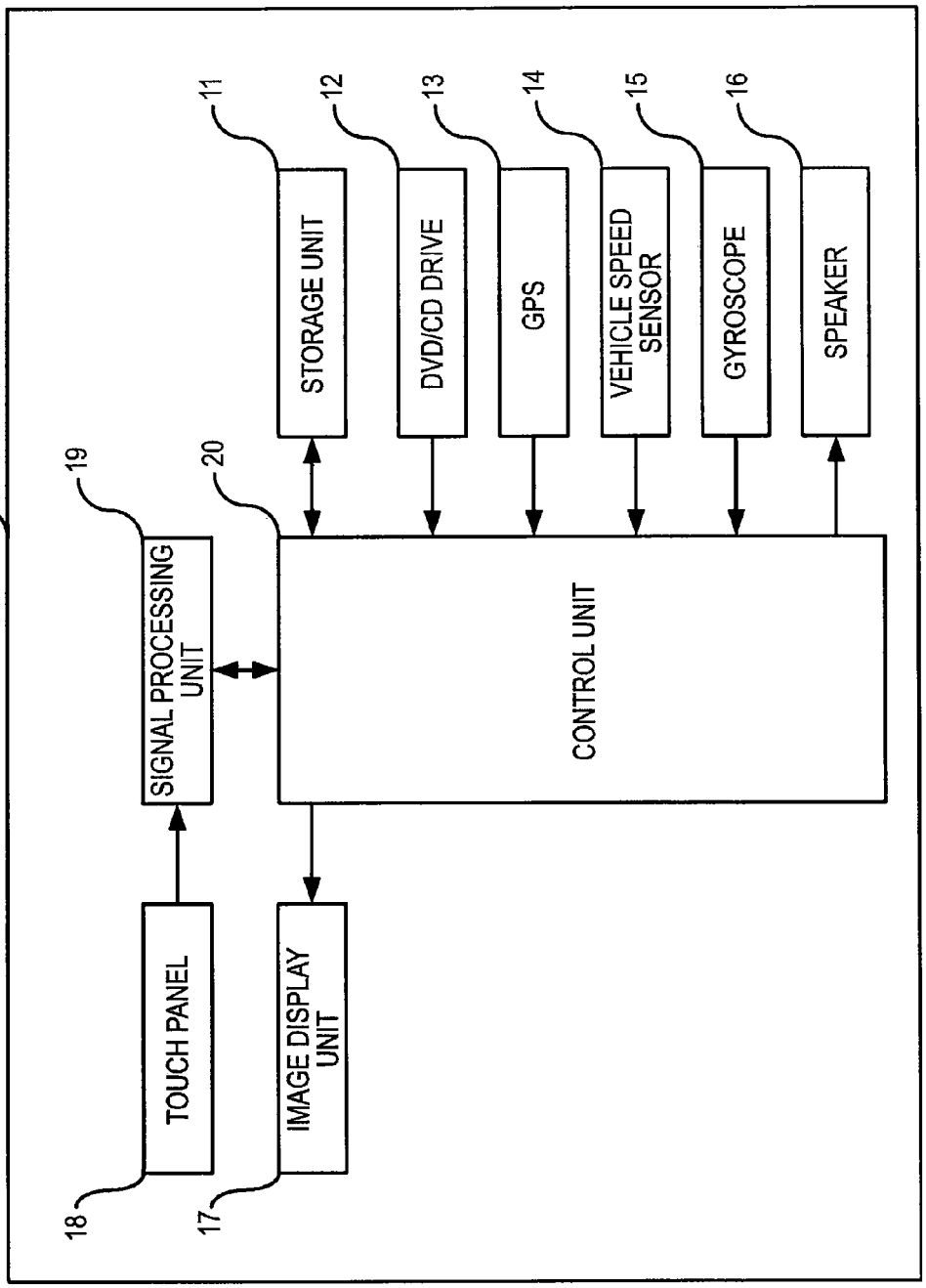
FIG. 1 is a block diagram illustrating the configuration of a vehicle-mounted apparatus according to an embodiment of the invention.

A block diagram illustrating the configuration of a vehicle-mounted apparatus according to an embodiment of the invention is shown in FIG. 1.

The vehicle-mounted apparatus according to this embodiment is a so-called car navigation apparatus which has a navigation function of performing a routing guidance and an audio reproducing function of reproducing an audio or a video recorded in a recording medium such as a DVD (Digital Versatile Disc) and which is described as an example of the vehicle-mounted device in the following description.

In FIG. 1, the vehicle-mounted apparatus 10 includes a storage unit 11, DVD/CD drive 12, a GPS receiver 13, a vehicle speed sensor 14, a gyroscope 15, a speaker 16, an image display unit 17, a touch panel 18, a signal processing unit 19, and a control unit 20.

Here, the DVD/CD drive 12, the GPS receiver 13, the vehicle speed sensor 14, the gyroscope 15, and the speaker 16 may not be built in the vehicle-mounted apparatus 10 and may be electrically connected to or disconnected from the vehicle-mounted apparatus 10.

The storage unit 11 stores basic programs necessary for controlling the vehicle-mounted apparatus 10 at the time of starting up the vehicle-mounted apparatus (or at the time of emergency), various programs such as application programs used to perform the navigation function or the audio reproducing function, and various databases such as a database of maps for navigation.

Similarly to typical storage devices, the storage unit 11 includes an area in which various programs or various data are expanded and an area in which an image is expanded.

The DVD/CD drive 12 is provided to reproduce a disc storing audio sources (or audio data) or video sources (or image data).

The GPS receiver 13 is provided to detect a signal from a GPS satellite.

The vehicle speed sensor 14 is provided to receive a vehicle speed signal from a vehicle and to determine the moving speed of the vehicle.

The gyroscope 15 is provided to detect a rotation or a vertical variation of the vehicle.

The speaker 16 is provided to output voice for audio guidance as one navigation function or audio or music reproduced by the DVD/CD drive 12.

The image display unit 17 is provided to provide various pieces of information such as a road map around the vehicle as a screen display to a passenger on the basis of various pieces of information such as map data or to display decoded image data recorded in the DVD on a screen.

The touch panel 18 is a transparent panel disposed on the surface of the image display unit 17. In this embodiment, a capacitance type touch panel is used and the display image displayed on the image display unit 17 is displayed through the touch panel 18.

The signal processing unit 19 outputs to the control unit 20 a position signal corresponding to a pressed position when the touch panel 18 is pressed (or contacted) by an operator or a signal corresponding to the distance between the touch panel 18 and the finger 53, which is calculated from the capacitance between the touch panel 18 and the finger 53.

The control unit 20 includes a micro processor and a peripheral circuit which is an electrical circuit for activating the micro processor and executes a control program stored in the storage unit 11 to perform various control processes. The control unit 20 performs the control processes to display image data obtained from the control result by the control unit 20 on the image display unit 17.

The control unit 20 acquires position information obtained by calculating the pressed position on the touch panel 18 from the signal processing unit 19 and verifies the acquired information with touch area information of the touch panel 18 stored in the storage unit 11. Then, the control unit performs the function defined for a button, a menu, or a switch involved in advance in the touch area corresponding to the pressed position.

In the vehicle-mounted apparatus 10 having the above-mentioned configuration, respective operations in a navigation mode where a destination setting function, a route editing function, a spot editing function, and a navigation setting function are performed using the GPS receiver 13 or the map data, a disc mode where the DVD/CD drive 12 or the DVD disc is utilized, and a radio mode where a radio tuner not shown is utilized are performed depending on an operator's (or a user's) selecting operation.

The operation of the vehicle-mounted apparatus having the above-mentioned configuration will be described below with reference to FIGS. 2 to 10.

In the following description, the functions of the vehicle-mounted apparatus are performed by causing an operator to selectively operate options which are hierarchically set.

In this embodiment, this is referred to as "hierarchical operation". The hierarchical operation means an operation of selecting hierarchized options (menus) in which plural items such as menu icons are displayed when an option such as a menu button is selected.

A high-level option means an option having a higher level of operation in the hierarchical operation and a low-level option means an option having a lower level of operation in the hierarchical operation.

In the following description, it is assumed that menu buttons are used as a high level and menu icons are used as a low level. Options may be additionally set as a level lower than the level of the menu icons.

More specifically, ones displayed on the display screen to select the above-mentioned modes are referred to as menu buttons and ones displayed on the display screen for an operator to select the functions assigned to each mode, such as the destination setting function, the route editing function in the navigation mode, are referred to as menu icons.

Here, the menu buttons may not be assigned for selection of the modes and the menu icons may not be assigned for selection of the functions.

For example, the menu buttons and the menu icons may be assigned to only the navigation mode. In this case, for example, the menu buttons may be assigned to the "routing guidance" or the "map display method", or the "basic setting" and the menu icons may be assigned to the "destination setting" or the "display of information around the destination" when the menu button of the "routing guidance" is selected. Alternatively, when the menu button of the "map display" is selected, the vehicle-mounted apparatus may be set so that the menu icons are assigned to the "planar view" or the "panoramic view". The functions to be assigned to the menu buttons or the menu icons may be properly set to correspond to the situations where the operation is hierarchically performed.

Figure 2:
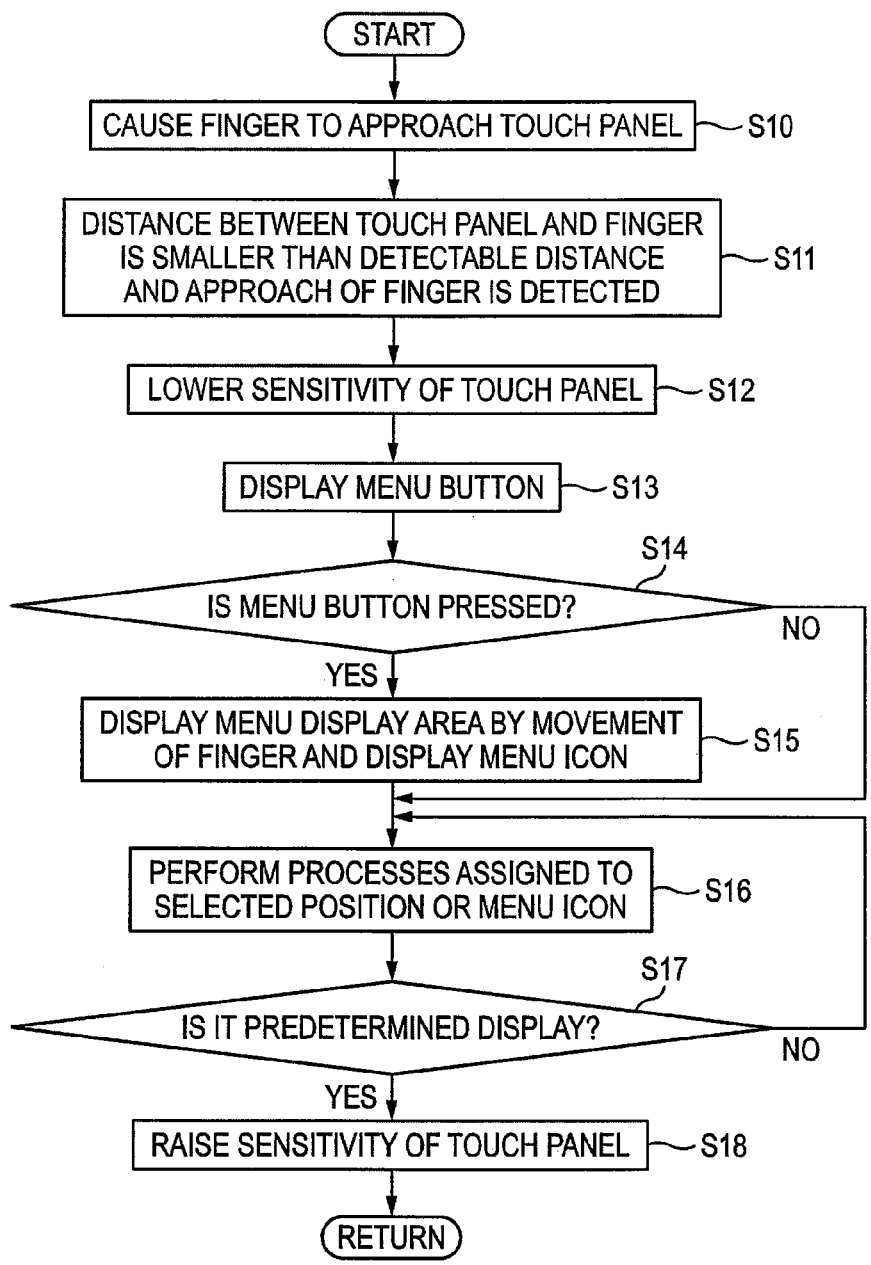
FIG. 2 is a flow diagram illustrating the operation of the vehicle-mounted apparatus.

FIG. 2 is a flow diagram illustrating an input process performed by the vehicle-mounted apparatus 10 when an operator presses the touch panel 18 to perform an input operation in the vehicle-mounted apparatus 10 according to an embodiment of the invention.

Here, the input operation includes selecting an option such as menu buttons or menu icons, causing an operator's finger or the like to approach the touch panel 18, and causing the operator's finger or the like to press the touch panel 18.

Figure 3:
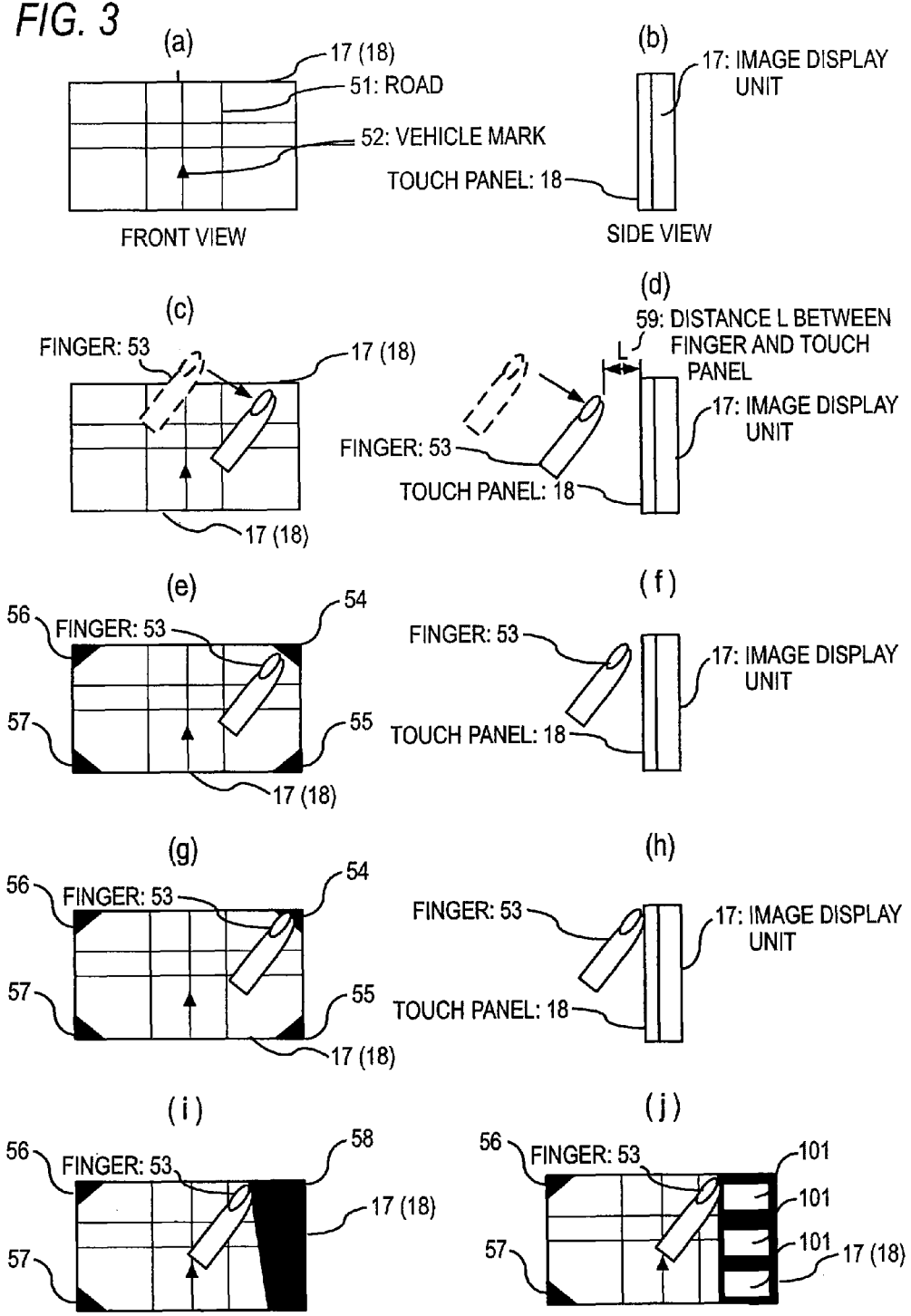
FIG. 3 is a diagram illustrating the operation of a vehicle-mounted apparatus according to a first embodiment of the invention, where
Figure 4:
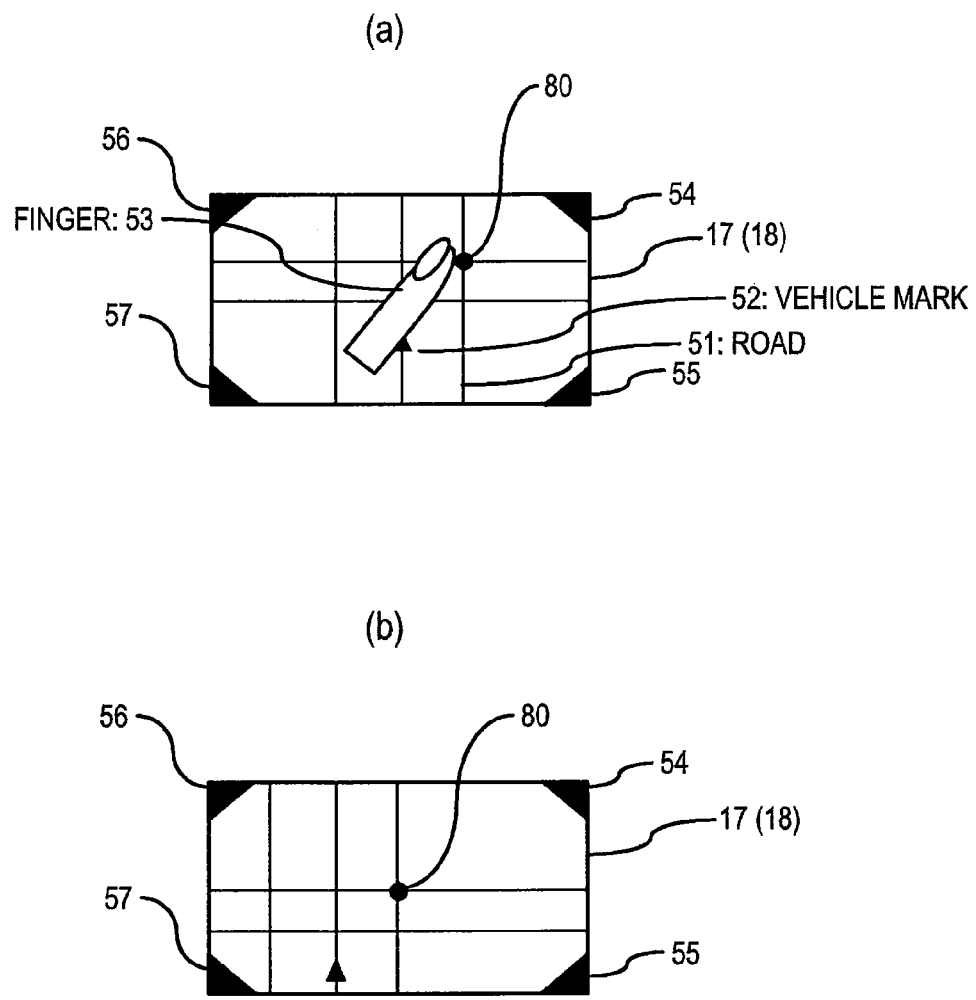
FIG. 4 is a diagram schematically illustrating the operation of the vehicle-mounted apparatus according to the embodiment of the invention when an area other than menu buttons is pressed, where

FIG. 3(*a*) is a front view of the image display unit 17 and the touch panel 18 and FIG. 3(*b*) is a side view of the state shown in FIG. 3(*a*).

As shown in FIG. 3(*a*), roads 51 around the vehicle and a vehicle mark 52 are displayed on the image display unit 17.

As shown in FIG. 3(*b*), the touch panel 18 and the image display unit 17 are disposed sequentially from the side with which the operator's finger 53 comes in contact in the vehicle-mounted apparatus 10.

In FIG. 2, at the time of starting the process flow, the input to the touch panel 18 is waited for and the sensitivity of the touch panel 18 is set to be high (START in FIG. 2).

Here, the state where the sensitivity of the touch panel 18 is high means such sensitivity that it can be determined whether the input operation on the touch panel is performed by the operator even when the operator's finger 53 does not come in contact with the touch panel 18.

For the purpose of operating the touch panel 18, as shown in FIGS. 3(*c*) and 3(*d*), the operator first causes the operator's finger 53 to approach the touch panel 18 (step S10). In FIGS. 3(*c*) and 3(*d*), the finger 53 indicated by a broken line represents the previous state in time series and the finger 53 indicated by a solid line means the subsequent state in time series.

FIG. 3(c) is a diagram illustrating a state where the operator causes the operator's finger 53 to approach the touch panel 18. FIG. 3(d) is a side view of the state shown in FIG. 3(c).

In this embodiment, the sensitivity of the touch panel 18 is set so that the signal processing unit 19 detects the approach of the finger 53 when the distance shown in FIG. 3(d), that is, the distance between the operator's finger 53 and the touch panel 18, is smaller than a predetermined distance L 59. The distance L 59 is, for example, about 1 centimeter.

Here, the distance L 59 is set to, for example, about 1 centimeter, and the "about 1 centimeter" is a distance set in consideration of a case where a vehicle passenger takes an action without intending to operate the vehicle-mounted apparatus 10.

That is, the "about 1 centimeter" is a distance set in consideration of a typical situation and set so that the vehicle-mounted apparatus 10 does not perform any unnecessary function performing operation when the vehicle passenger takes an action in the vicinity of the vehicle-mounted apparatus 10 without intending to operate the vehicle-mounted apparatus 10. This value is a distance properly set in consideration of the installation location of the vehicle-mounted apparatus 10 or the indoor layout of the vehicle.

After step S10, when the operator's finger 53 further approaches the touch panel 18 and the capacitance varying depending on the distance between the operator's finger 53 and the touch panel 18 becomes greater than the capacitance corresponding to the distance L 59 between the operator's finger 53 and the touch panel 18, the signal processing unit 19 detects the approach of the operator's finger 53 and calculates the position information of the operator's finger 53 (step S11).

When the approach of the operator's finger 53 to the touch panel 18 is detected and the position information of the operator's finger 53 is calculated in step S11, the position information is input to the control unit 20, and the control unit 20 sends out a control signal to the signal processing unit 19 on the basis of the position information and then lowers the sensitivity of the touch panel 18 (step S12).

When the position information of the operator's finger 53 is calculated and the control signal is sent out to the control unit 20 from the signal processing unit 19, the control unit 20 controls the image display unit 17 to display menu buttons 54 to 57 (step S13).

FIG. 3(e) is a diagram illustrating a state where the menu buttons 54 to 57 are displayed on the image display unit 17 when the distance L 59 between the finger 53 and the touch panel is smaller than the distance (for example, 1 centimeter) by which the touch panel 18 can senses the approach of the finger 53. In this example, the menu buttons 54 to 57 are displayed at four corners of the image display unit 17, respectively.

When the sensitivity of the touch panel is changed, an audio may be output from the speaker 16. When an audio is output from the speaker 16, the operator can determine that the vehicle-mounted apparatus 10 recognizes the contact of the operator's finger 53 and can smoothly perform a next operation.

Here, the distance L 59 between the touch panel 18 and the operator's finger 53 and the sensitivity of the touch panel 18 will be described.

When the distance L 59 between the touch panel 18 and the operator's finger 53 is set to be greater (that is, when the sensitivity is raised excessively), the vehicle-mounted apparatus 10 may erroneously operate by the influence of an operation other than the operation on the vehicle-mounted apparatus 10, such as an operation on a steering wheel or an operation on an air conditioner, or the fluctuation of the vehicle.

Accordingly, the distance L 59 is preferably set to be equal to or less than about 1 to 2 centimeters so as to detect the approach of the finger 53. When the sensitivity of the touch panel 18 is set on the basis of the value of the distance L 59, the erroneous operation of the touch panel due to the behavior other than the vehicle passenger's operation on the touch panel, such as the fluctuation of the vehicle, can be reduced, thereby making it easy for the operator to operate the touch panel 18.

When the menu buttons 54 to 57 are displayed on the image display unit 17 in step S13, the control unit 20 determines whether one of the menu buttons 54 to 57 displayed on the image display unit 17 is touched (step S14).

FIG. 3(f) is a side view of the state shown in FIG. 3(e). In step S13, the menu buttons 54 to 57 are displayed on the image display unit 17 in response to the signal sent to the control unit 20 from the signal processing unit 19.

FIG. 3(g) shows a state where the menu button 54 is pressed by the operator.

FIG. 3(h) is a side view of the state shown in FIG. 3(g), where the finger 53 comes in contact with the touch panel 18.

FIG. 3(i) is a diagram illustrating a state where the operator is moving his or her finger 53 while pressing the touch panel 18, where a menu display area 58 is displayed on the image display unit 17.

FIG. 3(j) is a diagram illustrating a state where menu icons 101 are displayed in the menu display area 58. When one of the menu buttons 54 to 57 is pressed in step S14, the process of step S15 is performed.

After step S14, when the operator moves the finger 53 on the touch panel 18 while pressing one of the menu buttons 54 to 57, the menu display area 58 is displayed depending on the moving distance and the menu icons 101 are displayed in the menu display area 58 (step S15).

By causing the operator to select one of the menu icons 101 displayed in the menu display area 58 displayed on the image display unit 17 and bringing the operator's finger into contact with the selected menu icon 101, the control unit 20 performs the function corresponding to the input operation. That is, the function assigned to the selected menu icon 101 is performed (step S16).

Here, the performing of the function assigned to the selected menu icon 101 means that the control unit 20 controls the vehicle-mounted apparatus to start the routing guidance of the navigation function, for example, when the selected menu icon is the "start of guidance" and that the control unit 20 controls the vehicle-mounted apparatus to start reproducing a piece of music, for example, when the selected icon indicates the title of the piece of music in a music track recorded in a DVD in reproduction.

The control unit 20 determines whether the contents displayed on the image display unit 17 after step S16 are a predetermined display such as the contents displayed before detecting the approach of the operator's finger 53. At this time, when another menu selection picture is additionally displayed, the operator selects the additionally displayed menu and the process of step S16 is repeated (step S17).

When the control unit 20 determines that the contents displayed on the image display unit 17 are the predetermined display in step S17, the sensitivity of the touch panel 18 is raised (step S18) and the flow of process is ended.

Here, when the process of step S16 is performed, it is determined in step S17 that the contents displayed on the image display unit 17 are not the predetermined display, and the control unit 20 determines that the operator does not perform any operation within a predetermined time, the predetermined display contents such as the current position of the vehicle displayed on the image display unit 17 before the operation may be displayed and then the process of step S18 may be performed.

According to this embodiment, the signal processing unit detecting the input to the touch panel changes the sensitivity for determining the input to the touch panel. Accordingly, the menu buttons can be displayed when the finger approaches the touch panel, and the number of displayed menu icons can be changed by sliding the finger on the menu buttons, thereby making it easy to operate the touch panel and to see the display screen.

In other words, according to this embodiment, by switching the sensitivity of the touch panel 18 for detecting the operator's operation between when the finger 53 approaches the touch panel 18 and when the finger 53 comes in contact with the touch panel 18, the menu buttons are displayed only when the operator's finger 53 approaches the touch panel 18. Accordingly, in the state where the operation on the touch panel 18 is not performed, the entire area in which an image is displayed on the image display unit 17 can be seen. In addition, since the operator can change the number of displayed menu icons by pressing (touching) the menu buttons displayed on the image display unit 17 with the finger 53 and causing the finger 53 to slide with the touched state maintained. As a result, the operation can be facilitated, and it is possible to implement the vehicle-mounted apparatus in which the area other than the menu display area, where an image other than the menu icons is displayed, can be guaranteed widely.

Since a capacitance type touch panel is used as the touch panel 18, a space for installing the signal processing unit detecting the approach of the user's finger is not necessary in the vicinity of the display unit of the image display device.

When it is determined in step S14 that any of the menu buttons 54 to 57 is not pressed, the control unit 20 performs the process of step S16.

FIGS. 4(a) and 4(b) are diagrams illustrating a display screen when an area other than the menu buttons 54 to 57 is pressed in step S14.

For example, as shown in FIG. 4(a), when a portion of the touch panel 18 corresponding to an intersection 80 of the roads 51 displayed on the image display unit 17 is pressed, the control unit 20 controls the image display unit 17 to locate the intersection 80 in the display screen at the center of the display screen and the intersection is displayed on the image display unit 17 like the display screen shown in FIG. 4(b).

Accordingly, a part (for example, the vehicle position or the information around the vehicle position in the navigation mode) which the operator (or the user) wants to see in operation among the display contents seen by the operator (or the user) before the operator performs an operation is not hidden by the display of the menu display area.

When one of the menu buttons 54 to 57 is pressed but the finger 53 does not move in step S14, the function assigned to the position pressed by the operator can be performed.

For example, menus for the CD operation are displayed when the menu button 54 is pressed, or menus for the radio broadcast are displayed when the menu button 55 is pressed, or menus of the DVD video are displayed when the menu button 56 is pressed.

In this way, when the finger 53 does not move after pressing one of the menu buttons 54 to 57, the operator can display the intended menus.

The functions assigned to the menu buttons are not limited to the above-mentioned functions, but other functions (for example, the navigation function, the phone function, and the TV function) may be assigned thereto.

Alternatively, the same function may be assigned to plural menu buttons among the menu buttons 54 to 57. Accordingly, the menu display area can be set from the position desired by the operator and the same operability can be guaranteed even in vehicles with steering wheels located laterally at different positions.

When the operator's finger 53 does not come in contact with the touch panel 18, that is, the input operation is not performed, for a predetermined time after the menu buttons 54 to 57 are displayed in step S13, the display of the menu buttons 54 to 57 may be stopped and the sensitivity of the touch panel may be raised under the control of the control unit 20.

<Variation 1 of Menu Display Area>

In the example of the screen display shown in FIG. 3(j), three menu icons 101 are displayed in the menu display area 58 by the movement of the finger 53, but another display example and display method will be described below.

As shown in FIGS. 5(a) to 5(c), an area in which an image is displayed on the display screen is divided into columns A to D. Areas A to D are set in advance to display three menu icons 101 in each of the areas A to D.

FIG. 5(a) shows a state where the finger 53 starts its movement from area A and ends the pressing of the touch panel 18 in area A when the operator moves the finger 53 to the left while pressing the menu button 54 in the state shown in FIG. 3(e). In this case, the menu display area 58 is displayed in only area A. In the display example shown in FIG. 5(a), three menu icons 101 are displayed in the menu display area 58.

FIG. 5(b) shows a state where the finger 53 starts its movement from area A and ends the pressing of the touch panel 18 in area B when the operator moves the finger 53 to the left while pressing the menu button 54 in the state shown in FIG. 3(e). In this case, areas A and B are displayed as the menu display area 58. In the display example shown in FIG. 5(b), six menu icons 101 in total are displayed in the menu display area 58.

FIG. 5(c) shows a state where the finger 53 starts its movement from area A and ends the pressing of the touch panel 18 in area D when the operator moves the finger 53 to the left while pressing the menu button 54 in the state shown in FIG. 3(e). In this case, areas A to D are displayed as the menu display area 58. In the display example shown in FIG. 5(c), twelve menu icons 101 in total are displayed in the menu display area 58.

Figure 5:
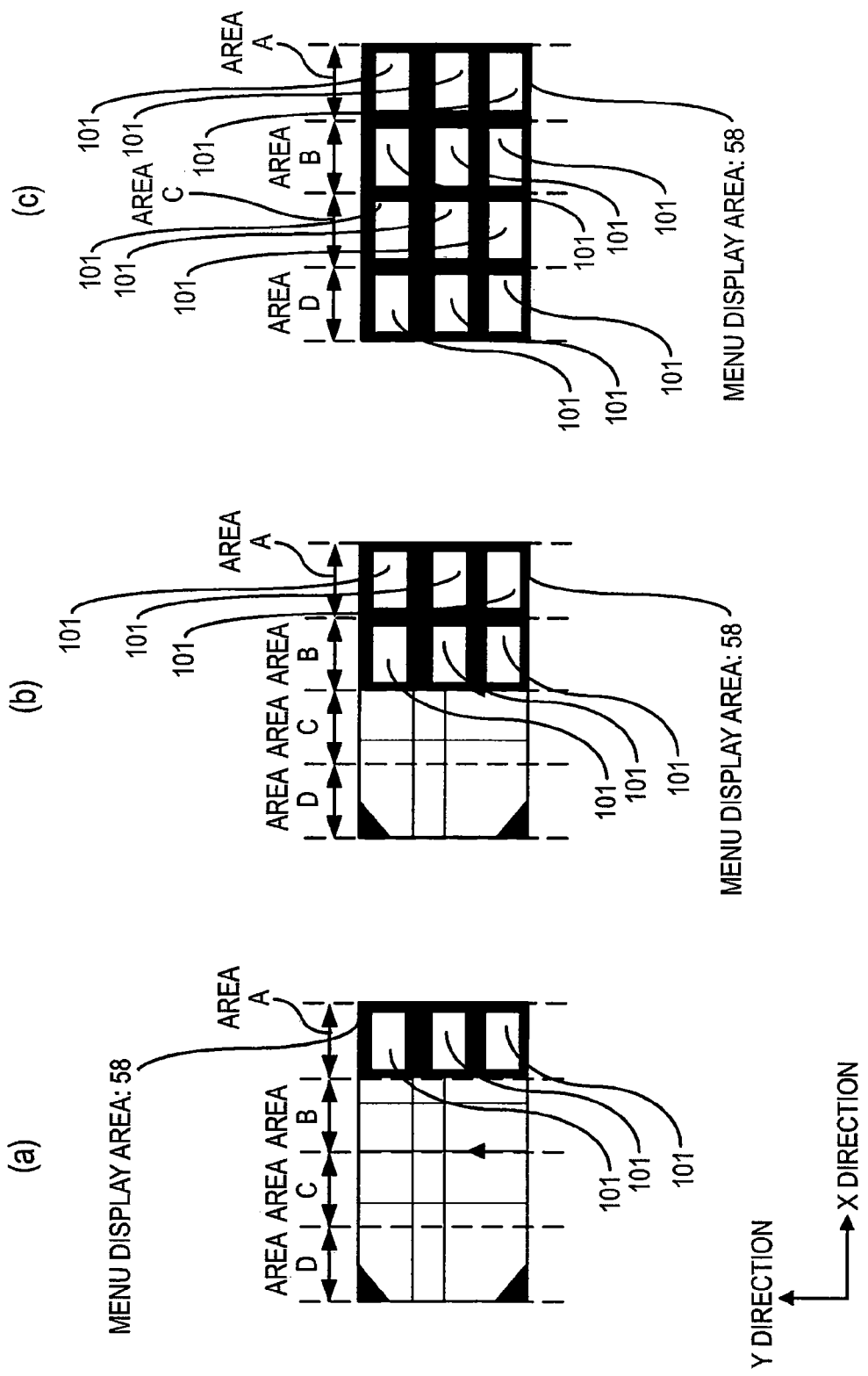
FIGS. 5(a) to 5(c) are diagrams schematically illustrating an example where the display of a menu display area is changed in accordance with the movement of a finger in the X direction in the vehicle-mounted apparatus according to the embodiment of the invention.

Although not shown in FIG. 5, when the operator moves the finger 53 to the left while pressing the menu button 54 and the finger 53 starts its movement from area A and ends the pressing of the touch panel 18 in area C, areas A to C are displayed as the menu display area 58 and nine menu icons 101 in total are displayed in the menu display area 58.

As described above, an area having the size determined by the operator is determined as the menu display area on the basis of the area where the operator starts pressing the touch panel and the area where the operator ends the pressing or the pressed-moving distance, and the menu icons of the number of desired by the operator can be displayed on the display screen.

The number of divided areas when the movement of the finger 53 is ended and the pressing of the touch panel 18 is ended is not limited to four.

That is, the display area may not be divided into four areas of area A to area D, but the display area may be properly divided into any number of areas and the number of icons displayed in the display area may be properly changed.

In this way, when it is assumed that the horizontal direction of the image display unit is the X direction and the vertical direction thereof is the Y direction, the operator can change the size of the menu display area depending on the moving distance of the operator's finger in the X direction.

<Variation 2 of Menu Display Area>

Figure 6:
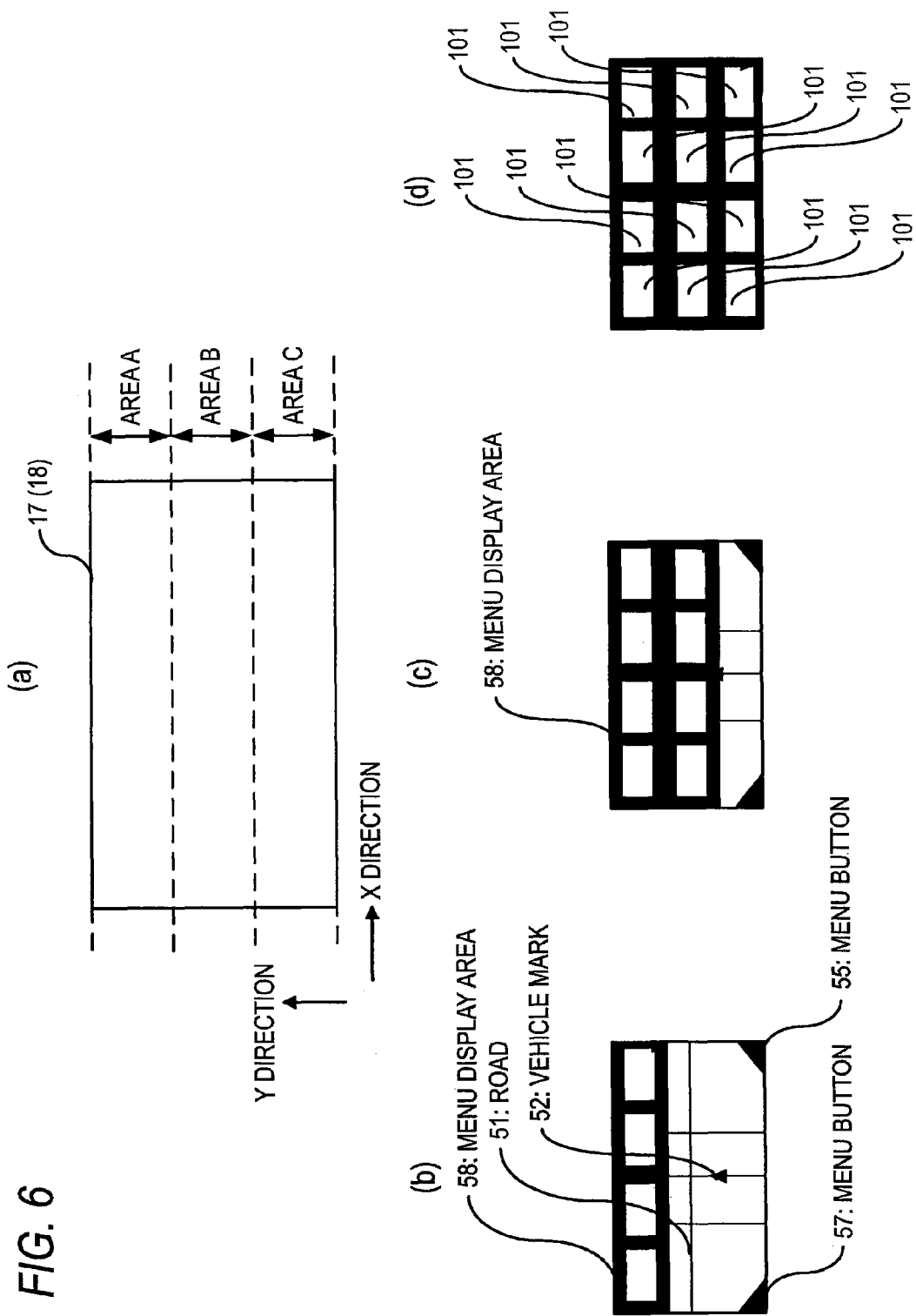
FIGS. 6(a) to 6(d) are diagrams schematically illustrating an example where the display of a menu display area is changed in accordance with the movement of a finger in the Y direction in the vehicle-mounted apparatus according to the embodiment of the invention.

The direction in which the operator moves the finger 53 may be the Y direction when it is assumed that the horizontal direction of the image display unit 17 is the X direction and the vertical direction thereof is the Y direction. FIG. 6 shows an example where the operator moves the finger 53 in the Y direction.

FIG. 6(a) shows an example of a method of dividing an area in the Y direction, where three areas A to C are defined in the horizontal direction.

FIG. 6(b) shows a state where the operator's finger 53 starting its movement from area A while pressing the menu button 54 ends the pressing of the touch panel 18 in area A in the state shown in FIG. 3(e). In this case, the menu display area 58 is displayed only in area A. In the display example shown in FIG. 6(b), four menu icons 101 are displayed in the menu display area 58.

FIG. 6(c) shows a state where the finger 53 starting its movement from area A while pressing the menu button 54 ends the pressing of the touch panel 18 in area B in the state shown in FIG. 3(e). In this case, the menu display area 58 is displayed in areas A and B. In the display example shown in FIG. 6(c), eight menu icons 101 in total are displayed in the menu display area 58.

FIG. 6(d) shows a state where the finger 53 starting its movement from area A while pressing the menu button 54 ends the pressing of the touch panel 18 in area C in the state shown in FIG. 3(e). In this case, the menu display area 58 is displayed in areas A to C. In the display example shown in FIG. 6(d), twelve menu icons 101 in total are displayed in the menu display area 58.

The number of divided areas of the menu display area 58 or the number of menu icons 101 is not limited to the above-mentioned example.

In this way, when it is assumed that the horizontal direction of the image display unit is the X direction and the vertical direction thereof is the Y direction, the operator can change the size of the menu display area depending on the moving distance of the operator's finger in the Y direction.

<Variation 3 of Menu Display Area>

The direction in which the operator moves the finger 53 may be the X and Y directions when it is assumed that the horizontal direction of the image display unit 17 is the X direction and the vertical direction thereof is the Y direction.

FIG. 7(a) shows an example of a method of dividing an area in the X and Y directions. In this case, the screen of the image display unit 17 is divided into three rows and four columns.

FIG. 7(b) shows a state where the operator's finger 53 starting its movement from area A while pressing the menu button 54 ends the pressing of the touch panel 18 in area A in the state shown in FIG. 3(e). In this case, the menu display area 58 is displayed only in area A and one menu icon 101 is displayed.

FIG. 7(c) shows a state where the operator's finger 53 starting its movement from area A while pressing the menu button 54 ends the pressing of the touch panel 18 in area B in the state shown in FIG. 3(e). In this case, the menu display area 58 is displayed only in areas A and B and two menu icons 101 are displayed.

FIG. 7(d) shows a state where the finger 53 starting its movement from area A while pressing the menu button 54 ends the pressing of the touch panel 18 in area E in the state shown in FIG. 3(e). In this case, the menu display area 58 is displayed only in area A, area B, area D, and area E and four menu icons 101 are displayed.

FIG. 7(e) shows a state where the finger 53 starting its movement from area A while pressing the menu button 54 ends the pressing of the touch panel 18 in area L in the state shown in FIG. 3(e). In this case, the menu display area 58 is displayed in all areas A to L and twelve menu icons 101 are displayed.

Although not shown in FIG. 7, the display range of the menu display area 58 can be changed similarly in any area.

In this way, when it is assumed that the horizontal direction of the image display unit is the X direction and the vertical direction thereof is the Y direction, the operator can change the size of the menu display area depending on the moving distances of the operator's finger in the X and Y directions.

Accordingly, the operator can display the menu display area 58 to avoid the area which the operator does not want to hide with the menu display area 58 and can operate the menu icons 101 while displaying the current location.

That is, when contents which the user wants to see are displayed in an area other than the menu display area and the menu is displayed by the operator's operation, it is possible to display the menu in the state where the contents which the user wants to see are displayed.

The number of divided areas of the menu display area 58 or the number of displayed menu icons 101 is not limited to the above-mentioned example.

<Variation 1 of Method of Dividing Area for Detecting Approach of Finger to Touch Panel>

A method of dividing a detection area on the touch panel 18 will be described below.

Figure 8:
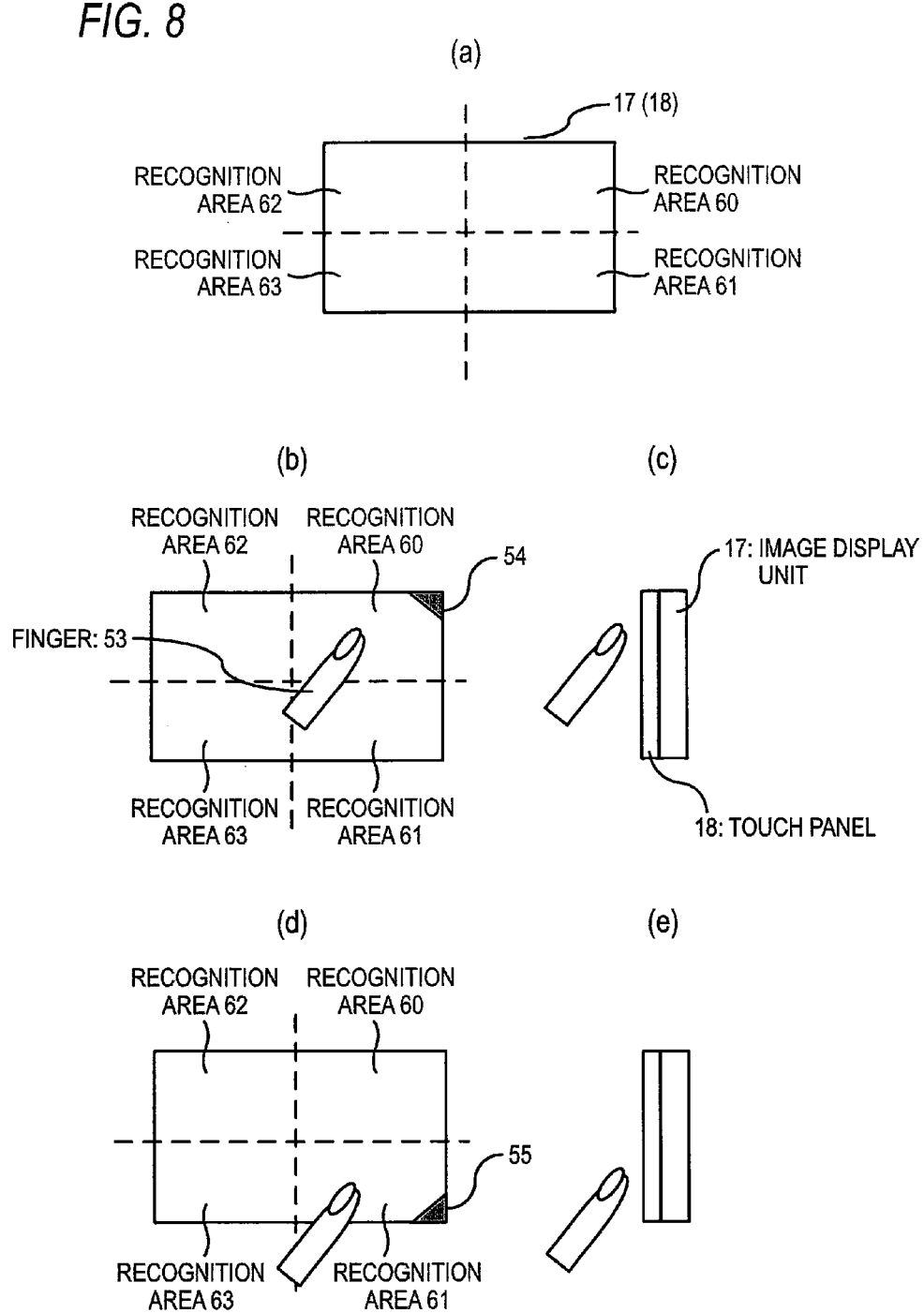
FIGS. 8(a) to 8(e) are diagrams schematically illustrating areas for recognizing that a finger approaches the touch panel.

FIG. 8 is a diagram illustrating an example where an area for detecting the approach of the finger 53 when the operator's finger 53 approaches the touch panel 18 is divided.

FIG. 8(a) is a diagram illustrating an example where the area for detecting the approach of the operator's finger 53 to the touch panel 18 is divided into four areas of recognition areas 60 to 63.

FIG. 8(b) is a diagram illustrating a state where the menu button 54 is displayed on the display screen when the operator's finger 53 approaches the recognition area 60 and the approach of the finger 53 to the touch panel 18 is detected.

FIG. 8(c) is a schematic side view of the state shown in FIG. 8(b).

FIG. 8(d) is a diagram illustrating a state where the menu button 55 is displayed on the display screen when the operator's finger 53 approaches the recognition area 61 and the approach of the finger 53 to the touch panel 18 is detected.

FIG. 8(e) is a schematic side view of the state shown in FIG. 8(d).

As shown in FIG. 8(a), when the display screen is divided into four recognition areas, the distance between the finger 53 and the touch panel 18 becomes equal to or less than the distance L 59 by causing the operator's finger 53 to approach the touch panel 18, and the operator's finger 53 is located over the recognition area 60, the signal processing unit 19 detects the position of the operator's finger 53 and outputs the position information to the control unit 20, and the control unit 20 controls the vehicle-mounted apparatus 10 to display the menu button (in this case, the menu button 54) only in the recognition area (in this case, the recognition area 60) including the position information (in this case, to display the contents shown in FIG. 8(b)).

Similarly, when the distance between the finger 53 and the touch panel 18 becomes equal to or less than the distance L 59 and the operator's finger 53 is located over the recognition area 61, the signal processing unit 19 detects the position of the operator's finger 53 and outputs the position information to the control unit 20, and the control unit 20 controls the vehicle-mounted apparatus 10 to display the menu button (in this case, the menu button 55) only in the recognition area (in this case, the recognition area 61) including the position information (in this case, to display the contents shown in FIG. 8(d)).

In this way, by dividing the area for detecting the approach of the finger 53 to the touch panel 18 into plural areas on the touch panel 18 in advance, only a desired menu button among the menu buttons displayed on the image display unit 17 can be displayed at the corners of the display screen of the image display unit. Accordingly, it is possible to suppress the size of the display area hidden by the menu buttons among the display area of the image display unit 17, thereby reducing the damage on visibility.

Although not shown, when the recognition area 60 and the recognition area 61 are set as one area and the finger 53 approaches the area (at least one of the recognition area 60 and the recognition area 61), the menu button 54 and the menu button 55 are simultaneously displayed at the corners of the display screen of the image display unit 17.

<Variation 2 of Method of Dividing Area for Detecting Approach of Finger to Touch Panel>

Another method of dividing a detection area on the touch panel 18 will be described below.

Figure 9:
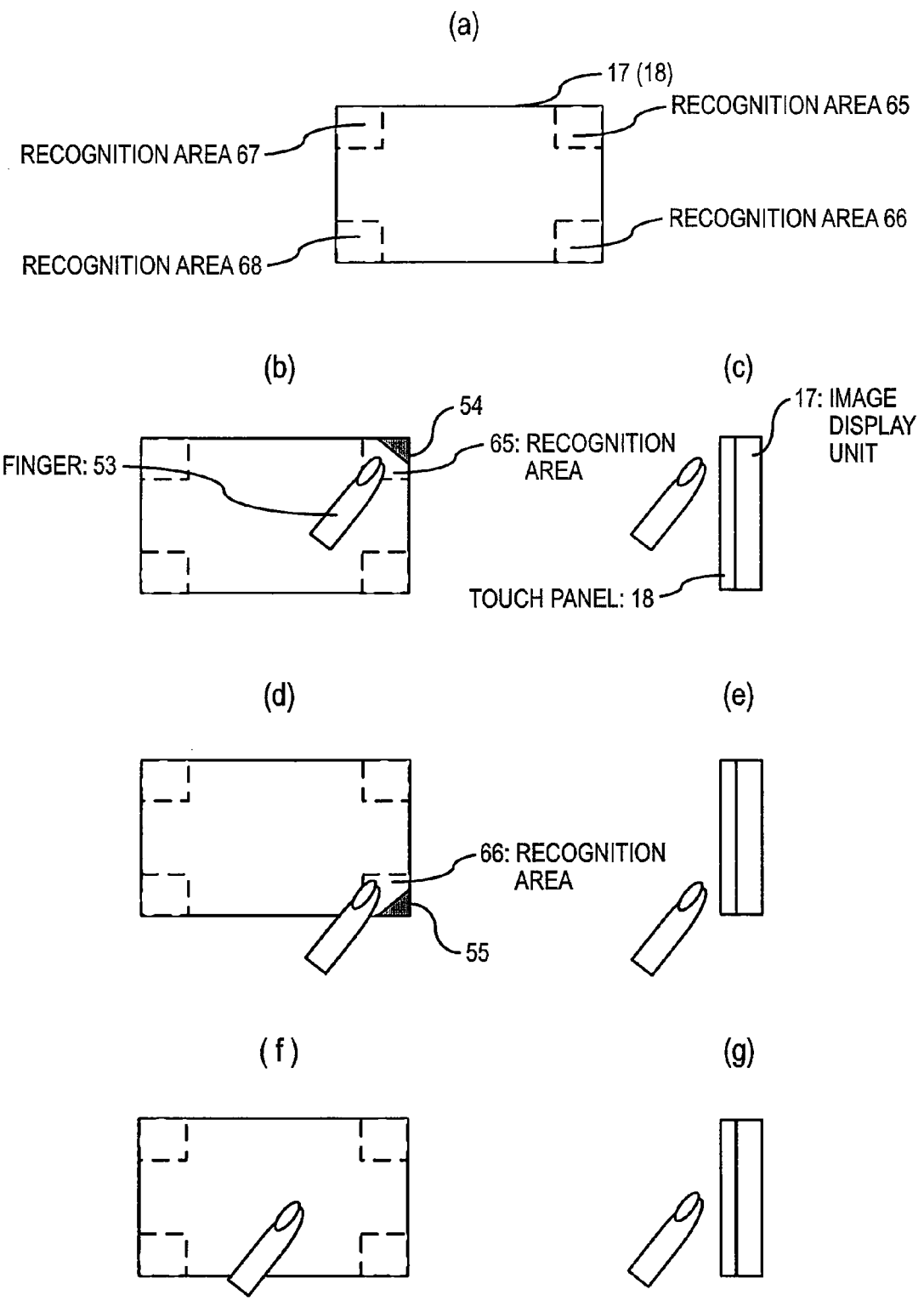
FIGS. 9(a) to 9(g) are diagrams schematically illustrating an example where a menu area is displayed only when a finger approaches a corner of the display area.

FIG. 9 is a diagram schematically illustrating an example where a menu button is displayed at a corner of the display screen which the finger 53 approaches when the finger 53 approaches corner of the display screen of the image display unit 17.

FIG. 9(a) is a diagram schematically illustrating an example where the display screen of the image display unit 17 is divided into recognition areas 1 to 4 and another area.

FIG. 9(b) is a diagram illustrating a state where the menu button 54 is displayed when the finger 53 approaches the recognition area 65 and the approach of the finger 53 to the touch panel 18 is detected.

FIG. 9(c) is a schematic side view of the state shown in FIG. 9(b).

FIG. 9(d) is a diagram illustrating a state where the menu button 55 is displayed when the finger 53 approaches the recognition area 66 and the approach of the finger 53 to the touch panel 18 is detected.

FIG. 9(e) is a schematic side view of the state shown in FIG. 9(d).

FIG. 9(f) is a diagram illustrating a state where the finger 53 approaches the area other than the recognition areas 65 to 68, where the operator's finger 53 does not exist in the recognition areas 65 to 68 and thus the menu buttons 54 to 57 are not displayed.

That is, it is assumed that the recognition areas are provided as partial areas existing in the vicinity of four corners on the display screen as shown in FIG. 9(a), instead of dividing the entire touch panel 18 as shown in FIG. 8(a). Then, when the distance between the finger 53 and the touch panel 18 becomes equal to or less than the distance L 59 by causing the operator's finger 53 to approach the touch panel 18 and the operator's finger 53 is located on the recognition area 65, the signal processing unit 19 detects the position of the operator's finger 53 and outputs the position information to the control unit 20, and the control unit 20 controls the vehicle-mounted apparatus 10 to display the menu button (in this case, the menu button 54) only in the recognition area (in this case, the recognition area 65) including the position information (in this case, to display the contents shown in FIG. 9(b)).

Similarly, when the distance between the finger 53 and the touch panel 18 becomes equal to or less than the distance L 59 and the operator's finger 53 is located on the recognition area 66, the signal processing unit 19 detects the position of the operator's finger 53 and outputs the position information to the control unit 20, and the control unit 20 controls the vehicle-mounted apparatus 10 to display the menu button (in this case, the menu button 55) only in the recognition area (in this case, the recognition area 66) including the position information (in this case, to display the contents shown in FIG. 9(d)).

When the distance between the finger 53 and the touch panel 18 becomes equal to or less than the distance L 59 and the operator's finger 53 is not located on any of the recognition areas 65 to 68, the signal processing unit 19 detects the position of the operator's finger 53 and outputs the position information to the control unit 20, and the control unit 20 controls the vehicle-mounted apparatus 10 not to display any of the menu buttons 54 to 57 (in this case, to be in the state shown in FIG. 9(f)).

According to this configuration, it is possible to suppressing an operation unintended by the operator from being performed by the approach of the operator's hand to a position other than the corners in the display area on the display screen. The shape or size of the recognition areas can be set arbitrarily.

Figure 10:
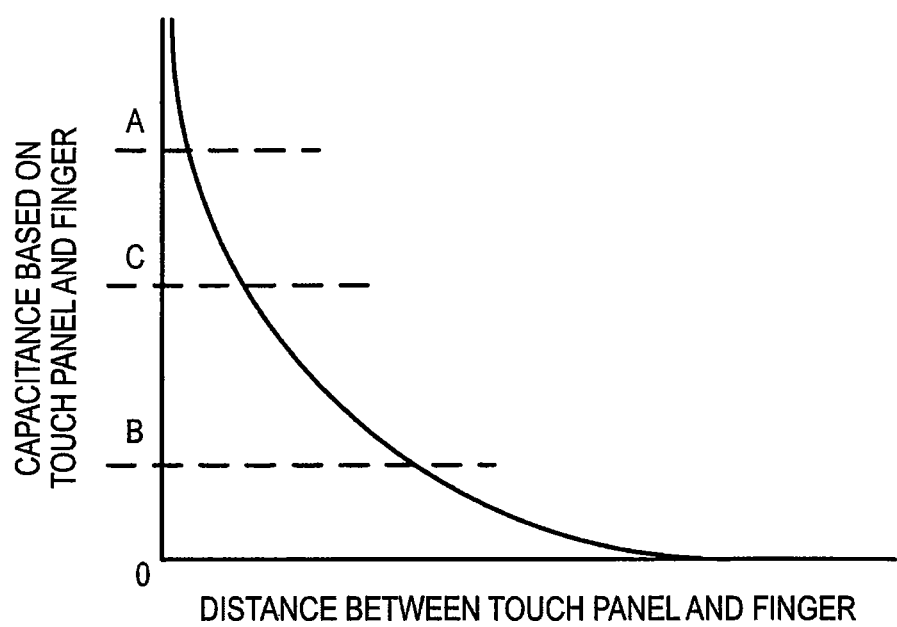
FIG. 10 is a diagram schematically illustrating the sensitivity.

The "sensitivity" in the above description will be described with reference to FIG. 10. FIG. 10 is a diagram schematically illustrating the sensitivity.

In FIG. 10, the horizontal axis represents the distance between the touch panel 18 and the finger 53 and the vertical axis represents the capacitance until the touch panel 18 is grounded via the finger 53. In the capacitance type touch panel, when a capacitive load such as the finger 53 comes in contact with the touch panel, a current flows in the touch panel 18 and the flowing current is converted into a voltage, the voltage is detected by the signal processing unit 19, and the detection result is processed by the signal processing unit 19, whereby the contact position is specified.

Since the voltage detected by the signal processing unit 19 also varies depending on the capacitance of the capacitive load, the detected voltage also varies depending on the variation in capacitance between the touch panel 18 and the finger 53, which is shows in the vertical axis of FIG. 10. The capacitance between the touch panel 18 and the finger 53 increases as the distance between the touch panel 18 and the finger 53 decreases, and decreases as the distance between the touch panel 18 and the finger 53 increases.

Accordingly, when the finger 53 approaches the touch panel 18 from the state where the distance between the touch panel 18 and the finger 53 is sufficiently great and the capacitance between the touch panel 18 and the finger becomes greater than a predetermined capacitance value (for example, C in FIG. 10), it is determined that the finger 53 comes in contact with the touch panel 18 and the contact position is calculated.

The change of the sensitivity means that a threshold value is changed. The threshold value serves as a reference for allowing the control unit 20 to determine that the finger 53 comes in contact with the touch panel when the capacitance value becomes the threshold value.

Referring to the curve shown in FIG. 10, the sensitivity can be changed by changing the threshold value serving as the reference value for determining the magnitude of the detected capacitance, such as A or B in the vertical axis.

That is, the raising of the sensitivity means that the threshold value is set to recognize an input even when the input is performed on the touch panel with a small capacitance value. When the sensitivity is raised and the operator's finger 53 is separated from the touch panel 18, the signal processing unit 19 notifies the control unit 20 of the position information on the position where the operator's finger 53 approaches the touch panel 18.

The lowering of the sensitivity means that the threshold value at which the input operation on the touch panel 18 is necessary with a great capacitance value (for example, the pressing or touching of the operator's finger 53 or the extreme approach to the touch panel) is set. When the sensitivity is lowered, the signal processing unit 19 notifies the control unit 20 of the position information on the position at which the operator's finger 53 comes in contact with the touch panel 18.

The sensitivity will be described below with reference to FIGS. 3 and 10 where the operation is shown. In this case, capacitance value A shown in the vertical axis of FIG. 10 indicates the capacitance value corresponding to the threshold value when the sensitivity is extremely lowered. Capacitance value B shown in the vertical axis of FIG. 10 indicates a capacitance value corresponding to a first threshold value which is a threshold value when the sensitivity is raised. Capacitance value C indicates a value between A and B, indicates the capacitance value corresponding to the changed sensitivity when the finger 53 and the touch panel 18 comes close to each other by equal to or less than the distance L 59 in the above-mentioned embodiment, and corresponds to a second threshold value which is a threshold value when the sensitivity is lowered.

When the touch panel 18 and the finger 53 are separated apart from each other and a distance therebetween is so far, the capacitance of charges existing between the touch panel and the finger 53 is small and is smaller than the capacitance value B shown in FIG. 10.

When the finger 53 approaches the touch panel 18 and the capacitance between the touch panel and the finger 53 is greater than capacitance value B shown in FIG. 10, the threshold value is changed to a lower threshold value corresponding to capacitance value C.

When the capacitance value at the time of contacting the touch panel is A and the threshold value corresponding to capacitance value C lower than capacitance value A is set, it is possible to satisfactorily detect the contact of the finger 53 with the touch panel 18. The change from threshold value B corresponding to capacitance value B in the vertical axis to the threshold value corresponding to capacitance value C causes the changes in sensitivity.

In the invention, the raising of the sensitivity means to raise the sensitivity so that the control unit 20 determines that the input operation on the touch panel 18 is performed even when the operator's finger 53 does not come in contact with the touch panel 18. The lowering of the sensitivity means to lower the sensitivity so that the control unit 20 determines that the input operation is performed when the touch panel 18 is touched. Threshold value B and threshold value C can be set arbitrarily.

The lowered-sensitivity state means the state where the sensitivity is low or the low sensitivity. The raised-sensitivity state means the state where the sensitivity is high or the high sensitivity.

The sensitivity can be changed by a method of changing the gain of a detection waveform in the signal processing unit 19 in addition to the method of changing the threshold value. Accordingly, the sensitivity can be adjusted by hardware in addition to the adjustment of the sensitivity by software and it is possible to easily cope with an erroneous operation due to the operator's contact miss or disturbance such as vehicle noise.

Although the navigation apparatus in which the storage unit 11 is mounted on the vehicle-mounted apparatus 10 has been exemplified in the invention, the invention can be similarly embodied by an audio apparatus not having a navigation function or a display apparatus not having an audio function and a navigation function.

While the invention has been described in content with reference to the specific embodiments, it is obvious to those skilled in the art that the invention can be changed or modified in various forms without departing from the concept and scope of the invention.

This application is based on Japanese Patent Application (Japanese Patent Application No. 2009-025745), field on Feb. 6, 2009, the contents of which are incorporated herein by reference.

INDUSTRIAL APPLICABILITY

As described above, in the capacitance type touch panel in the image display device according to the invention, the signal processing unit detecting an input to the touch panel changes the sensitivity for determining the input to the touch panel depending on the distance between the finger 53 and the touch panel. Accordingly, the menu buttons are displayed when the finger 53 approaches the touch panel and the number of displayed menu icons can be changed by sliding over the menu button and adjusting the display area of the menu icons. As a result, it is easy to operate the touch panel and to see the display screen. The image display device can be applied to a vehicle-mounted apparatus such as a navigation apparatus.

REFERENCE SIGNS LIST

10: VEHICLE-MOUNTED APPARATUS
11: STORAGE UNIT
12: DVD/CD DRIVE
13: GPS
14: VEHICLE SPEED SENSOR
15: GYROSCOPE
16: SPEAKER
17: IMAGE DISPLAY UNIT
18: TOUCH PANEL
19: SIGNAL PROCESSING UNIT
20: CONTROL UNIT
51: ROAD
52: VEHICLE MARK
53: FINGER
54: MENU BUTTON
55: MENU BUTTON
56: MENU BUTTON
57: MENU BUTTON
58: MENU DISPLAY AREA
59: DISTANCE L BETWEEN FINGER AND TOUCH PANEL
80: INTERSECTION BETWEEN ROAD AND ROAD
101: MENU ICON

The invention claimed is:

1. An image display device in which options for performing functions of the image display device are hierarchized, comprising:
    an image display unit that displays the options;

a capacitance type touch panel that is disposed on the surface of the image display unit;

a signal processing unit that detects the capacitance varying with respect to an input operation on the touch panel; and a control unit that performs a function corresponding to the input operation, wherein the control unit:

a) sets the sensitivity of the touch panel to detect an operator's finger having a distance greater than zero between the touch panel and the operator's finger by setting a capacitance threshold, b) detects the operator's finger after setting the sensitivity in step a) by detecting the capacitance threshold being exceeded, c) displays high level menu buttons on the image display responsive to step b), d) changes the sensitivity of the touch panel to detect the operator's finger touching the touch panel by decreasing the capacitance threshold, e) detects location of the operator's finger after changing the sensitivity in step d) by detecting where on the touch panel the decreased capacitance threshold has been exceeded; and f) detects which of the high level menu buttons have been touched based on the results of step e), g) displays low level menu buttons on the image display which corresponds to which of the high level menu buttons have been touched based on where on the touch panel the decreased capacitance threshold has been exceeded in step e) wherein respectively different low level menu buttons which have been previously hidden are displayed depending upon which of the high level menu buttons have been touched.

2. The image display device according to claim 1, wherein the signal processing unit converts a variation in the capacitance into a voltage; and wherein the control unit compares a value of the voltage converted by the signal processing unit with a second threshold value greater than a first threshold value and changes the sensitivity of the touch panel when the control unit determines that the value of the voltage output from the signal processing unit is greater than the first threshold value.

3. The image display device according to claim 1, wherein the control unit divides the image display unit into a plurality of areas and displays the high-level option corresponding to an area where the operator's finger is detected.

4. The image display device according to claim 1, wherein the control unit displays the high-level option in at least one corner of the image display unit.

5. The image display device according to claim 1, wherein when it is detected that the capacitance is equal to or greater than a predetermined value as the operator's finger is approached to the touch panel, the control unit displays the high-level option at a corner closest to a position of the finger where an input operation is detected among corners of the image display unit on the image display unit.

6. The image display device according to claim 1, wherein the control unit sets the display area to an area including a position where the operator's finger starts pressing the touch panel and a position where the operator's finger ends the pressing of the touch panel.

7. The image display device according to claim 1, wherein the control unit sets the display area to a rectangular area having a line segment, as a diagonal, that connects a position where the operator's finger starts pressing the touch panel and a position where the operator's finger ends the pressing of the touch panel.

\* \* \* \* \*